July 3, 1956

M. L. TURNER 2,752,829

PULP MOLDING

Filed Jan. 23, 1952

*INVENTOR.*
MILTON L. TURNER
BY Arthur L. Connolly

ATTORNEY

INVENTOR.
MILTON L. TURNER
BY Arthur S. Connolly
ATTORNEY

INVENTOR.
MILTON L. TURNER
BY Arthur L. Connolly

ATTORNEY

July 3, 1956 M. L. TURNER 2,752,829
PULP MOLDING

Filed Jan. 23, 1952 9 Sheets-Sheet 9

INVENTOR.
MILTON L. TURNER
BY Arthur G. Connolly

ATTORNEY

United States Patent Office 2,752,829
Patented July 3, 1956

2,752,829

PULP MOLDING

Milton L. Turner, Fairfield, Maine, assignor to Keyes Fibre Company, Portland, Maine, a corporation of Maine Application January 23, 1952, Serial No. 267,787

7 Claims. (Cl. 92—56)

The present invention relates to the forming of articles out of molded fibrous pulp, particularly to apparatus for performing this type of molding.

Among the objects of the present invention is the provision of a pulp molding apparatus having a simplicity greater than heretofore obtainable.

Further objects of the present invention include the provision of novel pulp molding apparatus which uses only a single pair of dies in a highly practical arrangement for inexpensively mass-producing quantities of molded pulp articles. An additional object of the present invention is the provision of pulp molding apparatus using dies having very simple types of movements that are readily effected.

The above, as well as still further objects of the present invention, will be more readily understood from the following description of several of its exemplifications, reference being made to the accompanying drawings wherein.

According to the present invention, a highly effective pulp molding apparatus is provided by a forming die having a face shaped to correspond to the contours of the desired article to be molded, operating mechanism connected to said die to alternately move the die into a first position with its face in a pulp slurry and into a second position out of the slurry, said mechanism including substantially linear guides to substantially linearly translate the die into and out of the second position with the die face held facing the second position, a pressing die having a face mating with the face of the forming die, support structure connected to said pressing die for holding it opposite said second position with its face held to receive the forming die as it is moved into said second position, said operating mechanism being connected to apply suction and form a pulp mass in the first die while it is in the slurry and to press the dies together in said second position to compact the formed mass and transfer it to the pressing die, said operating mechanism also including unloading elements connected to transfer the compacted mass from the second die onto a carrier when the forming die is withdrawn from the second position.

Figure 1:
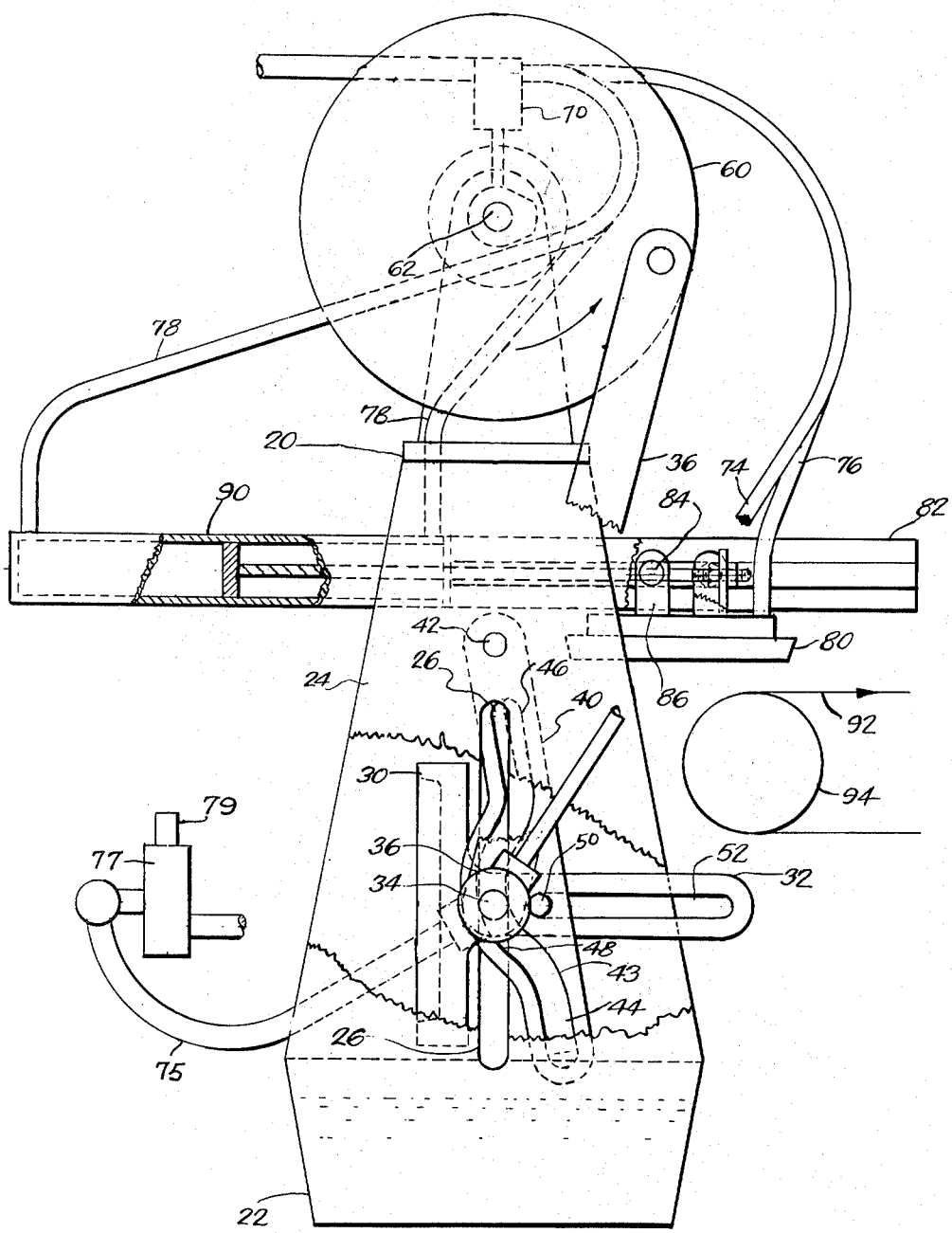
Fig. 1 is a side view with parts broken away of one type of pulp molding apparatus embodying the present invention.
Figure 2:
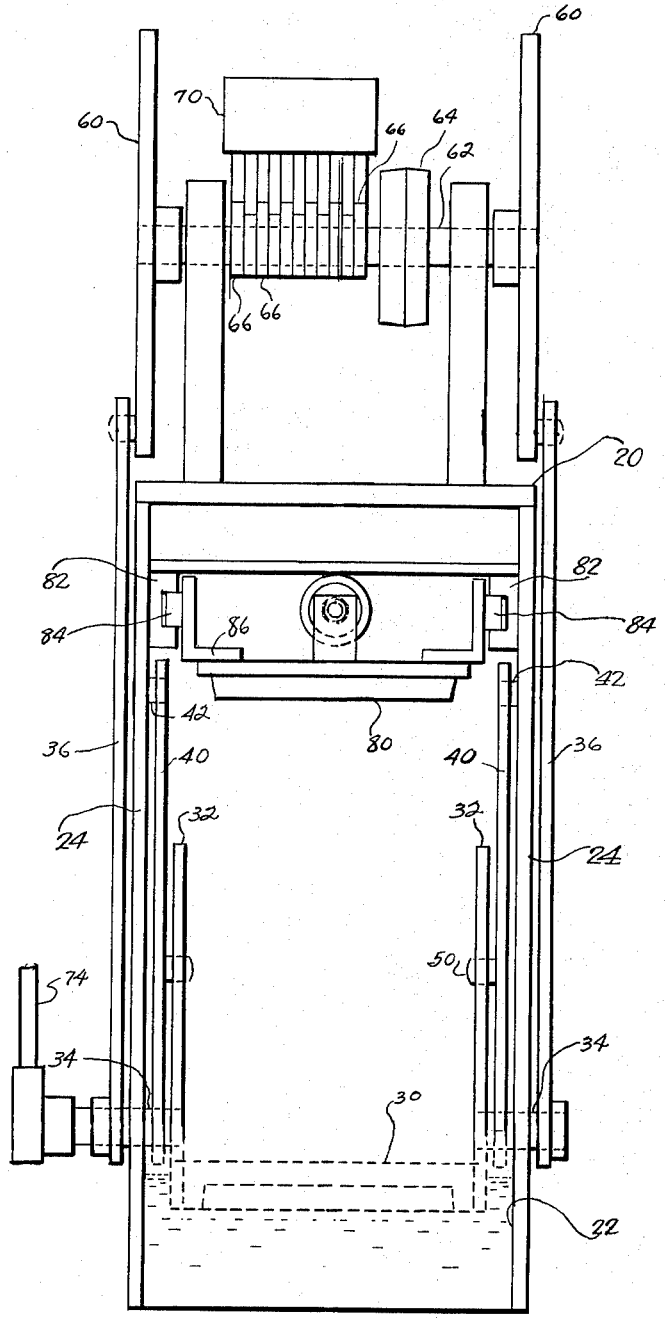
Fig. 2 is a front view of the apparatus of Fig. 1 with parts shown in a different operative position.

The operation of the apparatus as well as its novel features are best described in connection with the drawings. Referring to the construction of Figs. 1 and 2, there is here shown a molding apparatus having a framework 20 in the lower portion of which there is formed a tank 22 for the conventional pulp slurry with which the apparatus is used. The framework 20 includes side frames 24, each of which is shown in Fig. 1 as having a vertically extending linear slot 26. Within these slots there is supported a forming die 30 which is held on a carrier having a pair of outstanding parallel arms 32, 32. Outwardly projecting opposed stub shafts 34 projecting from the arms 32 are slidably received in the respective slots 26, 26 and provide operating elements by which the die 30 is held in place and suitably operated, as by means of the reciprocating rods 36, 36.

The framework 20 also supports die inverting elements shown as including a pair of deflecting links 40 pivotally suspended by studs 42 above slots 26. Each deflecting link is provided with a deflecting guide slot 43 having linear end portions 44, 46 and an offset intermediate portion 48. The mold carrying stud shafts 34 project through the deflecting slots 43 so that as these shafts traverse the framework slots 26, the deflecting links are automatically tilted from the position shown in Fig. 3 to the position shown in Fig. 1 and vice-versa.

The deflecting links 40 are also provided with a slidable connection with arms 32. In the form shown in Fig. 2 this connection is established by a pin 50 on each deflecting link and inverting track or slots 52 in arms 32.

The forming die 30 is hollow and has a die face that is perforated in any of the well known manners so that the application of suction through the perforations will cause the liquid from the pulp slurry to be sucked through, depositing a layer of pulp on the die face. Examples of suitably perforated die constructions are shown in U. S. Patent No. 2,192,937, granted March 12, 1940, U. S. Patent No. 2,129,697, granted September 13, 1938; and U. S. Patent No. 1,984,384, granted December 18, 1934.

Operation of the reciprocating rods 36 can be effected in any desired manner such as by connecting their remote ends concentrically with crank wheel 60 which may conveniently be journalled on drive shaft 62 rotatably mounted in the upper portion of framework 20. This shaft can also be provided with a set of cams 66 to cooperate with and help control the suitably timed application of suction, compressed air, or the like, and assist with the molding. For this purpose a block or assembly of manifolds 70 can be fitted with poppet valves or the like operated by respective cams 66 to effect the desired operation. Conduits such as flexible conduits 74, 76 and 78 may be used to interconnect valves lines with the desired portion of the apparatus. Conduit 74 is conveniently connected to the hollow interior of the forming die as by way of a central passageway in one of the stub shafts 34. In this way a pulp depositing vacuum is controllably applied to this die, maintained as long as desired, and compressed air supplied when desired to assist in the transfer of the formed pulp on to the pressing die. Instead of having a single conduit 74, two can be provided, separately connected through the different stub shafts 34. To simplify the withdrawal of liquid sucked out from the forming mold, the suction line can be positioned at a low level so that the liquid does not have to be drawn uphill to any significant extent. As shown in Fig. 1 the forming mold suction line can be provided at 75 to connect with a remote control valve 77 operated by line 79 energized from manifold 70.

At a suitable location above the forming die 30, there is provided a pressing die 80 for coaction with the forming die to press the formed pulp. Each of these dies has a face that is contoured to press the pulp into the shape corresponding to that of the desired articles, the respective faces being complemental or mating with respect to each other. In the apparatus shown in Figs. 1 and 2 the pressing die 80 is mounted in laterally slidable condition on a pair of grooved rails 82, rollers 84 being desirable to reduce the sliding friction as by being carried on brackets 86 secured to the pressing die. This die can be arranged for reciprocation along the tracks by any convenient means such as the air cylinder 90 which may be of the single-acting spring-return type or the double-acting type as shown. The pressing die 80 is arranged to be laterally shifted between a position over forming die 30, and another position on one side over an unloading device such as belt conveyor 92, which can be suitably mounted on a roller 94.

Figure 3:
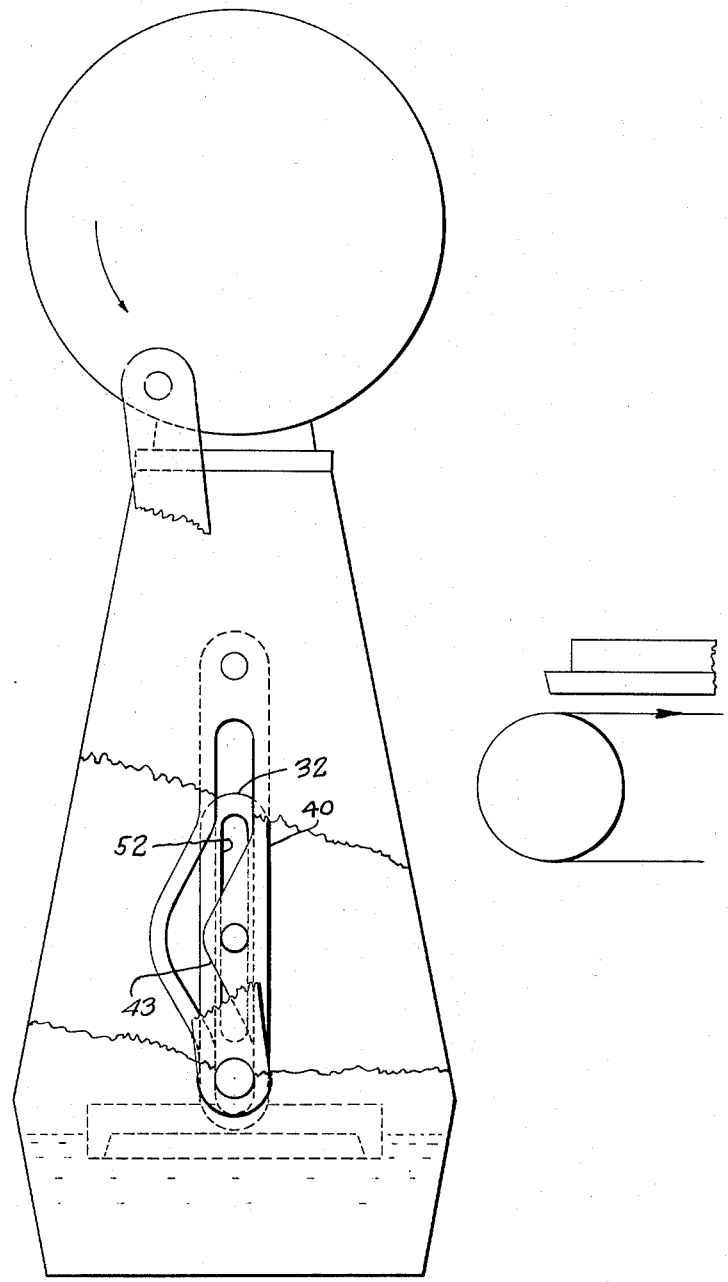
Figs. 3, 4 and 5 show in somewhat schematic form sequential steps in the operation of the apparatus of Fig. 1.
Figure 4:
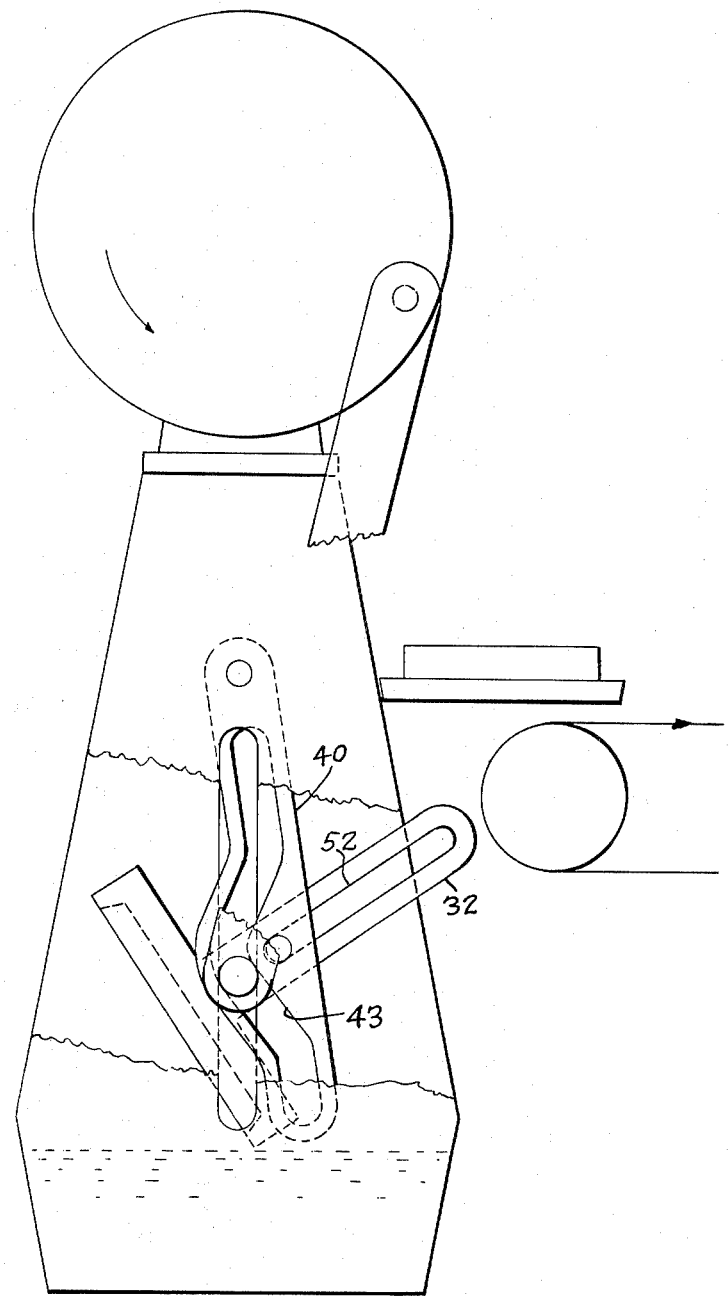

In operation, the shaft 62 is driven as by means of a belt engaging with a suitably provided pulley 64. Rotation of the shaft causes the cranks 60 to rotate thereby reciprocating rods 36 up and down. By this reciprocation, die 30 is carried from an initial position immersed in the pulp slurry as shown in Fig. 3 through successively higher positions shown in Figs. 4, 1 and 5 respectively. During this elevation the shafts 34, moving upwardly in the linear end portions 44 of deflecting slots 43, raise the forming die 30 without changing its inclination or tilt. The inverting slots 52 permit arms 32 to move up with the forming die while pins 50 are held stationary by stud shafts 34 which align slots 26 and the linear portions 44 of the deflecting slots.

When the forming die is lifted far enough to carry its stub shafts 34 into the intermediate or offset portion 48 of the deflecting slot, the deflecting links 40 are forced to one side by engagement between the stub shafts and the wall edges of slot portion 48. This deflecting action moves pins 50 over to one side of the elevating slots 26, thereby tilting arms 32 as well as the forming die that they carry between them. Further lifting of the stub shafts 34 causes the die 30 to be completely inverted to the face-up condition shown in Fig. 5, by the time the stub shafts leave the intermediate portion 48 of the deflecting slots and enter the upper linear portion 46 of these slots.

Figure 5:
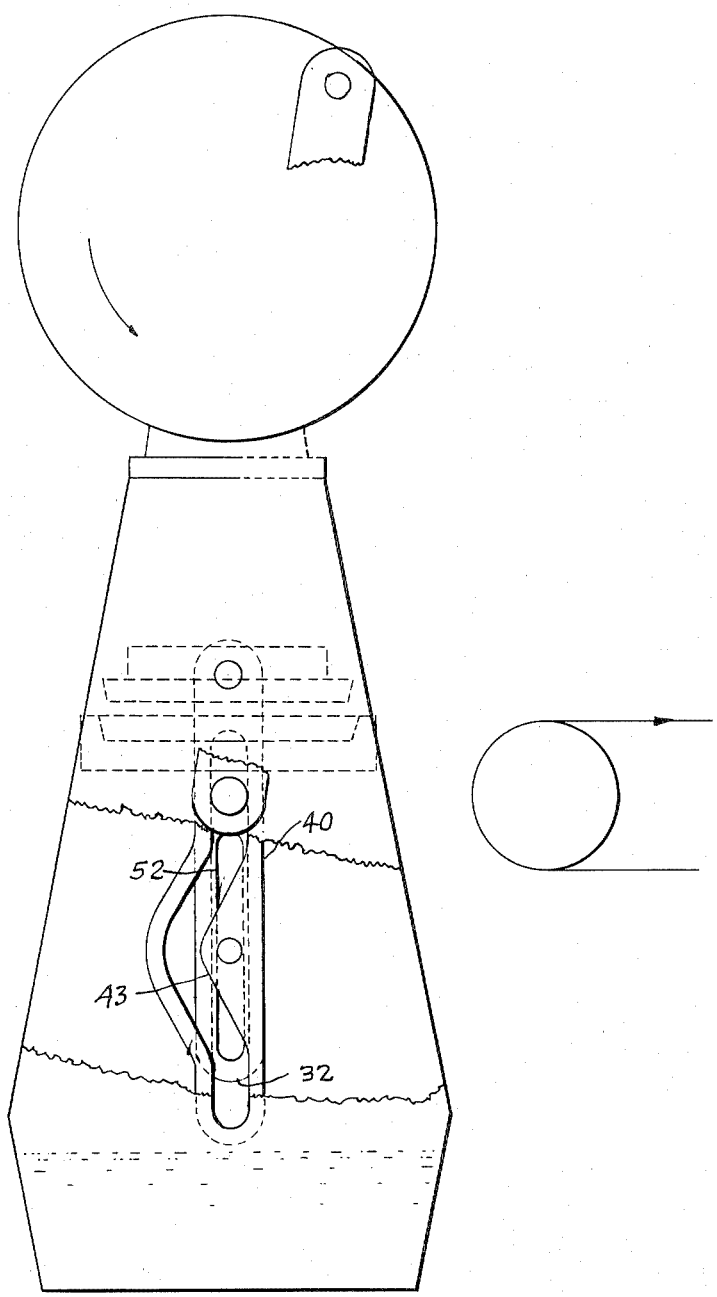

While this is happening, the pressing die 80 is moved over to a position over the upwardly carried forming die 30, as shown in Fig. 5, and continued upward motion of this die brings the two dies together in pressing engagement. In the last part of its upward movement the linear slot portions 46 keep the forming die aligned in face-up condition so that it does not tilt but merely translates into proper pressing engagement with pressing die 80. The layer of fibrous pulp deposited on the forming die while it is in the slurry and carried up on its face is thereby subjected to compacting and expressing of a large portion of its water content.

Continued rotation of cranks 60 then reverses the movements of the forming die so that it is again inverted to face-down condition and lowered into the pulp slurry. In this return operation, as soon as the forming die has cleared away from the pressing die, the pressing die can be slid over to displaced position over conveyor 92, and the pressed pulp mass dropped or blown onto the conveyor so that it can be carried through subsequent finishing operations. The movements of the respective dies are synchronized so that at each reciprocation of the forming die the pressing die is suitably engaged and the pulp mass transferred to the pressing die.

To assist in the transfer of the formed pulp mass onto the pressing die, this die can also be made hollow with a perforated face and be supplied with suction as by means of conduit 76. By using such suction together with a puff of compressed air through the forming die 30, as the dies part, a highly effective transfer is assured. The suction applied to pressing die 80 is terminated when the pressed pulp is to be deposited on the conveyor 92, and this deposit can also be made more positive by an appropriately timed puff of compressed air to this die.

Figure 6:
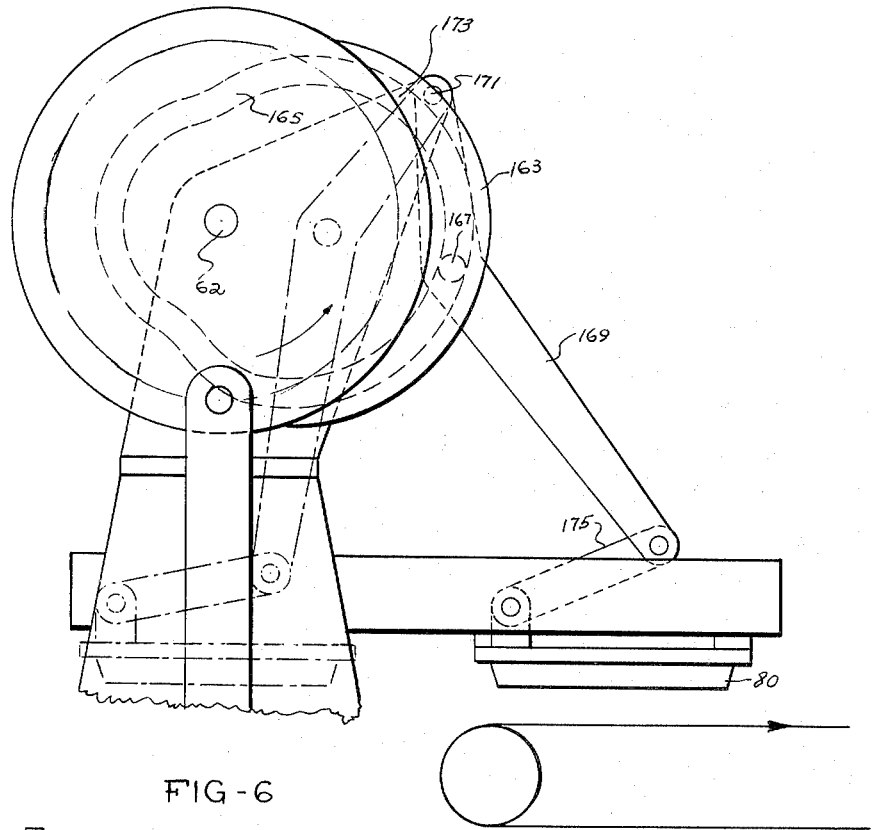
Figs. 6 and 7 are broken-away detail views of an apparatus similar to Fig. 1 but with portions of the operating mechanism modified.
Figure 7:
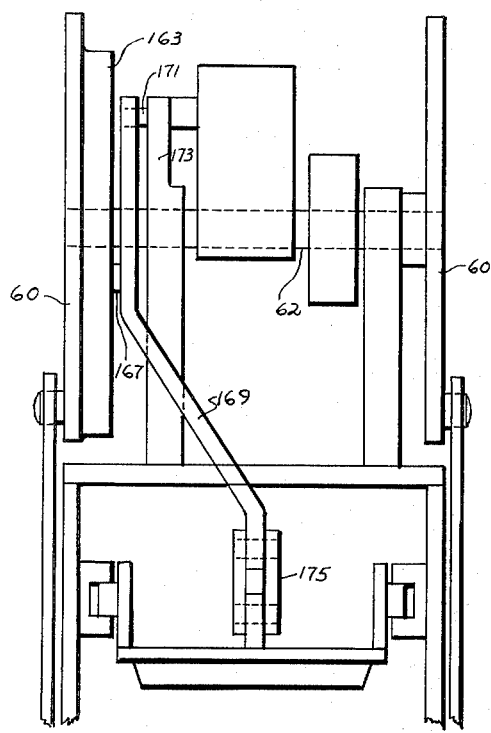

Although the pressing die 80 is shown in the construction of Fig. 1 as reciprocated by air or liquid pressure, this movement is also readily accomplished by a mechanical arrangement. Figs. 6 and 7 show such a modification of the invention. Here the drive shaft 62 is provided with an additional cam 163 which can conveniently be fastened to or made integral with one of the cranks 60. This cam is shown as having a cam track 165 in which is received a follower roller or stud 167 carried by a rocker arm 169. Through a suitable mount and guide for this arm, as for example by the pivoted fastening 171 to an extension 173 of a fixed drive-shaft supporting portion of frame 20, the rocker arm is cammed by this shaft through the proper reciprocating movement. A link connection 175 can be used to transmit this movement to the pressing die. The remainder of the apparatus of Figs. 6 and 7 can be identical with that of Figs. 1 and 2.

Conversely to the above, the reciprocation of the molding die 30 in either of the above apparatuses can be effected by pneumatic or hydraulic actuation with an appropriately provided actuating cylinder. In fact, any type of actuation is suitable providing it makes possible the desired dwell of the respective dies in the forming and pressing positions.

Figure 8:
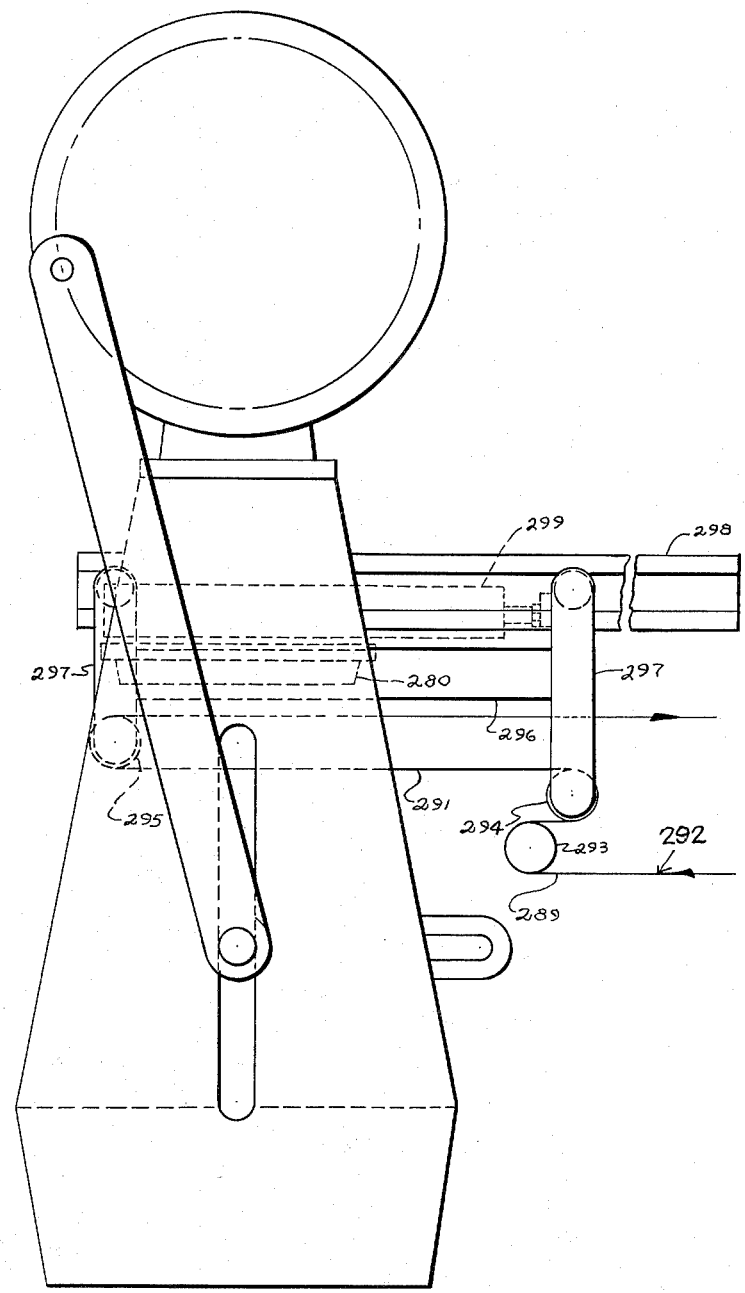
Figs. 8 and 9 are views similar to Figs. 1 and 2 of a different embodiment of the present invention.
Figure 9:
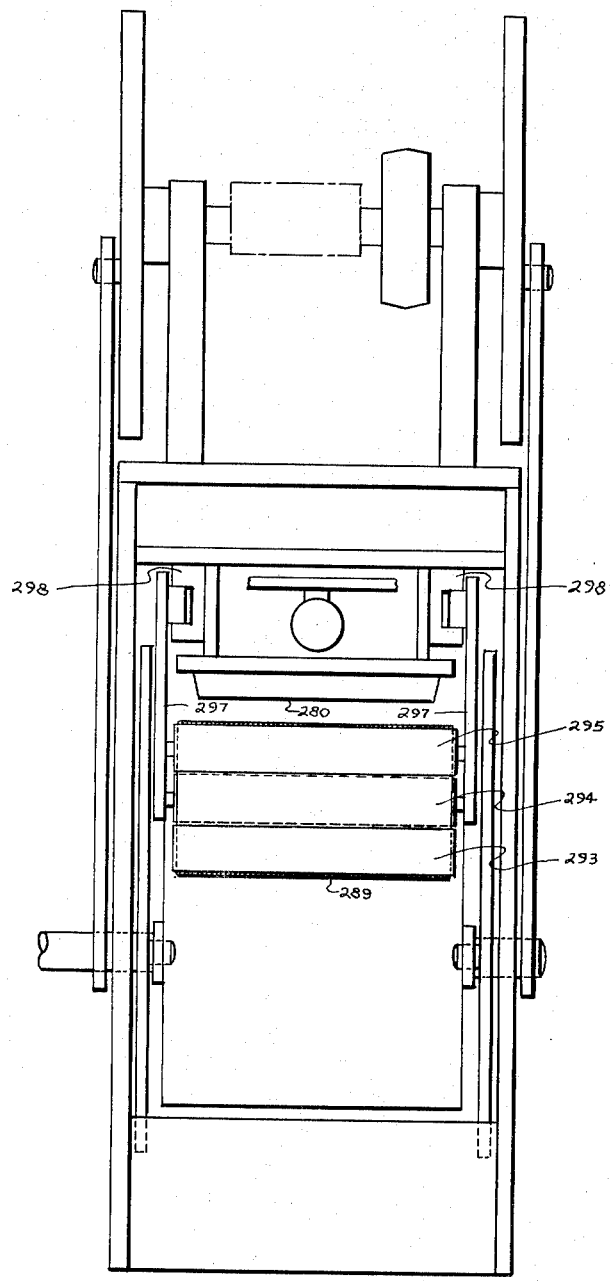
Figure 10:
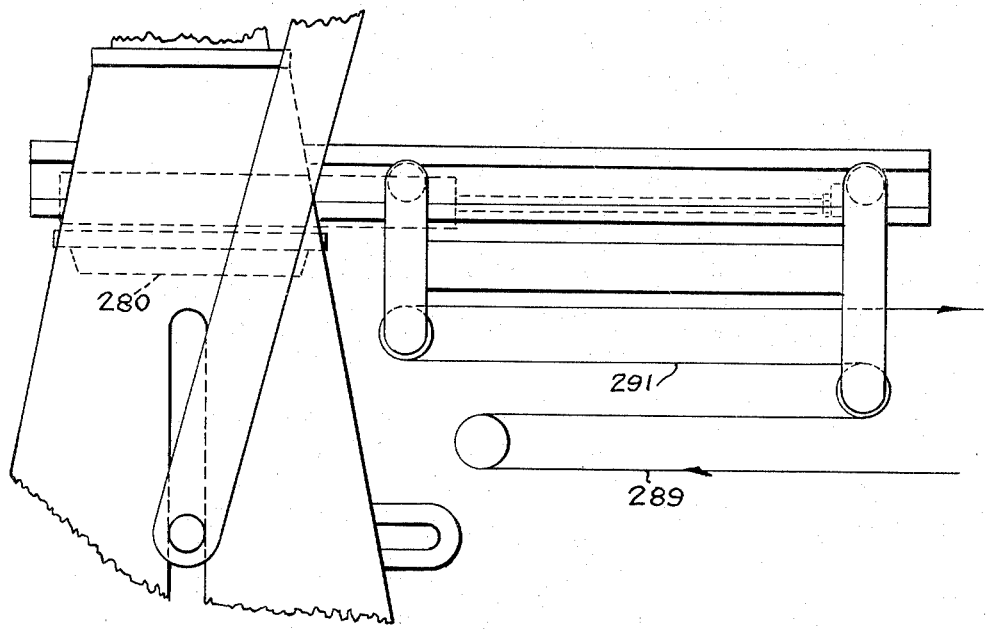
Fig. 10 is a schematic view showing the apparatus of Fig. 8 in a different operative position.

Figs. 8 and 9 show a further construction in accordance with the present invention, and in which the pressing die can be perfectly stationary during operation, without in any way complicating the movement of the molding die. As shown, the pressing die can be fixed in place at 280 where it is to be engaged by the molding die as in the constructions of Figs. 1 and 6. However, the conveyor 292 is here provided with a set of reversing rollers 293, 294, 295 around which the belt is threaded to form two loops 289, 291. The lower loop-forming roller 293 can be journalled in fixed position while the upper rollers 294, 295 are mounted on legs 297 of a carriage 296 slidably suspended from rails 298. This carriage holds the loop 291 and by sliding to and fro along the rails alternately carries this loop under the pressing die 280 and retracts the loop from under it to permit it to be engaged by the molding die. In retracted position the loop 291 and its associated structures are as shown in Fig. 10. The actuation of the carriage 296 can be by a mechanical arrangement or by a fluid-operated cylinder as shown at 299.

In the construction of Figs. 8 and 9 the pressed pulp masses are dropped onto loop 291 of the conveyor 292 while this loop is under the pressing die. The carriage 296 is then actuated to retract this loop. In the meantime the conveyor itself is kept moving in the direction indicated by the arrows. It is important that the rate of carriage retraction be not higher than the rate of conveyor movement to assure that the articles dropped onto loop 291 are carried along by the top run of this loop. An excessively rapid carriage travel will cause the roller 295 to move faster than the top run of the conveyor belt so that the belt on the top run is wound backwards over the overtaking roller 295. As a result, articles carried on loop 291 will be in danger of being spilled backward over the advancing roller 295.

Where movement of carriage 296 is rapid and accordingly requires a rapid movement of the conveyor belt, the feet of the unloaded articles to subsequent handling or operating units can be effected at the same high speed. If desired, the feed can be at a lower speed, as for example by transferring these articles from the conveyor 292 to a second conveyor moving at a slower speed and thereby carrying the articles more closely spaced. The second conveyor can also be moved at a speed higher than the first conveyor if desired.

Figure 11:
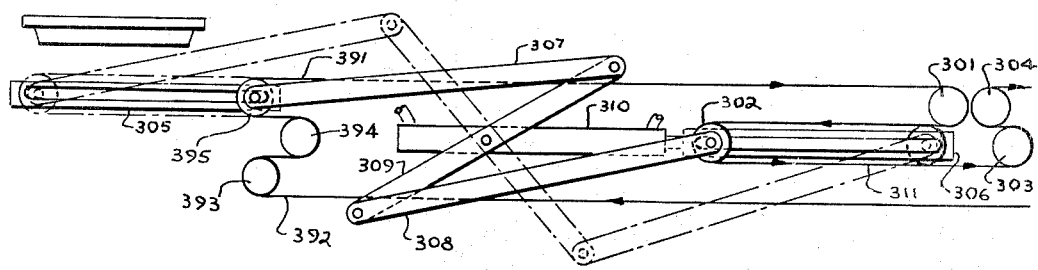
Fig. 11 is a fragmentary view of a modified form of the apparatus of Fig. 9 showing a further example of the invention.

Fig. 11 shows a further embodiment of the invention in which a fixed pressing die and a movable conveyor loop are combined without limiting the retracting speed of the loop. The conveyor here shown at 392 is threaded around three end rollers 393, 394 and 395, as in the construction of Fig. 8. In addition, however, four take-up rollers 301, 302, 303 and 304 are provided some distance from the reversing end of the conveyor.

Rollers 393, 394, 301, 303 and 304 are kept at fixed position whereas rollers 395 and 302 are shiftable along tracks 305, 306 and are synchronized for simultaneous movement toward and away from each other as by the linkage 307, 308 and 309. The shiftable rollers are shown as actuated by a fluid operated cylinder 310 to alternately shift the conveyor between the full line position and the position shown in dot-dash lines.

In the dot-dash position the conveyor presents a looped portion 391 under the pressing die for unloading purposes. Upon retraction into the full line position the upper run of loop 391 advances at a speed higher than the conveyor movement itself, the slack being taken up by the loop 311 formed internally around rollers 302, 303. As a result, the article being unloaded cannot move backward. The rollers 301, 304 can be positioned so close to each other that the unloading articles automatically move across the conveyor gap thus formed.

Where the molding apparatus of the present invention uses a movable pressing die, as in the examples of Figs. 1 and 6, the pressing die movement is not limited to being a sliding type of motion but can instead be of any other type such as pivotal, for example. Pivoting action of this type is conveniently supplied by suspending the pressing die from a suitable number of sets of parallel links pivoted at their upper portions along pivot axes above and on the unloading side of the pressing position. If desired, the links can be replaced by a unitary frame pivotally depending from a corresponding axis. Such a unitary frame construction will introduce some tilting of the die as it moves from one end of its travel range to the other. Where this tilting is excessive it can be compensated for by corresponding tilting the conveyor belt at the location where it receives the unloaded articles from the pressing dies.

In accordance with the present invention the molding die need not be face down in its forming position, nor need it be face up in the pressing position. Thus, by way of example, the lower linear portions 44 of the deflecting guide slot 43 can be partially or completely eliminated, and the slurry tank suitably changed in position, so that the molding die is still inclined from the horizontal, when it reaches its lowermost or forming position. The entire apparatus including framework 20 may also be inclined so that the dies are at an angle with respect to the horizontal, when they are pressed together. In addition, operating mechanisms different from those shown above can be used to shift the molding die from the slurry tank to the pressing location while carrying it in substantially any desired orientation, so long as the final portion of the movement into the pressing position is substantially linear.

A feature of the present invention is the fact that it provides an apparatus that operates at very high efficiencies with only two dies. One of the major drawbacks against the prior techniques for manufacturing molded pulp articles has been the requirement to use mass production machines that must be equipped with as many as sixteen or twenty dies each, and these dies which have to be carefully shaped to close tolerances, are very expensive. As a result many commercially desirable items could not take advantage of the low cost pulp molding techniques because the available capital was insufficient to cover the cost of the many dies previously required.

With the present equipment however, the very small die investment needed is well within the range of any production requirements even for as little as a few thousand articles. Of course the individual dies can, if desired, be of the multiple cavity type so that a corresponding multiplicity of articles is produced at each machine cycle. Furthermore a number of individual dies can be mounted side by side to move as a group in the manner shown for single dies in the above figures, thus also increasing the production capacity and still holding the number of dies down to a fraction of the previous requirements.

In connection with the crank driving arrangement for the forming dies in the construction of the above figures, it is also helpful to counterweight the drive and thereby balance out part or all of the weight of the forming die as well as the reciprocating rods 36. Such counterweighting is conveniently provided by affixing suitable balance weights to the crank wheels 60 opposite the point at which rods 36 are connected.

Instead of using an endless conveyor for receiving the unloading articles, other unloading mechanisms such as chutes, roller type conveyors, etc., are also highly suitable.

As many apparently widely different embodiments of this invention may be made without departing from the spirit and scope hereof, it is to be understood that the invention is not limited to the specific embodiment hereof, except as defined in the appended claims.

What is claimed is:

1. In a pulp molding apparatus for making articles from fibrous pulp, a tank for holding pulp slurry, a forming die having a die face shaped to correspond to the contours of a desired article, actuating means for moving said forming die from a position wherein said forming die is immersed in the slurry within said tank, with its die face facing in one direction, to a position remote from said tank wherein said die face faces a direction substantially opposite to said first mentioned direction, said actuating means being adapted to move said forming die in a straight-line path toward a pressing die, situated adjacent said position remote from said tank, during at least the latter portion of the movement of said forming die toward said position remote from said tank, said actuating means being adapted to bring the die face of said forming die into compressive relationship with a complementary die face on said pressing die, the forming and pressing dies being so positioned during said compressive relationship that they are linearly arranged with each other and with the position of said forming die when said forming die is in its immersed position within the tank, means for applying a suction behind the die face of said forming die while said forming die is immersed in the slurry in said tank and for applying fluid pressure through the die face of said forming die against a compacted mass thereon after compression between said forming and pressing dies has taken place, means for applying a suction behind the die face of said pressing die after compression between said forming and pressing dies has taken place at the same time as the fluid pressure is applied through the face of the forming die, whereby the mass is transferred to the pressing die, and for, thereafter, applying fluid pressure through the die face of said pressing die against a compacted mass held thereon to unload said mass from said pressing die, and means for causing the unloading of said compacted mass to take place onto a conveyor for conveying said mass to an unloading station and unloading it at the said station, said conveyor being completely situated in a position remote from the position at which compression between said forming and pressing dies takes place and in a plane substantially perpendicular to the linear plane extending between said forming and pressing dies when in compressive relationship at least during the time that unloading from the conveyor takes place.

2. The apparatus of claim 1 in which the pressing die is mounted for simple reciprocating movement from its pressing position to an unloading position and back.

3. The apparatus of claim 1 in which the pressing die is mounted in fixed position and the conveyor comprises a movable carrier connected to move adjacent the pressing die when the forming die is withdrawn, receive a pressed pulp mass from the pressing die, and retract to unload the received mass.

4. In a pulp molding apparatus for making articles from fibrous pulp, a single forming die having a face shaped to correspond to the desired article, operating mechanism connected to said die to alternately move the die into a first position face down in a pulp slurry and into a second position out of the slurry, said mechanism including stationary linear guides to linearly translate the die into and out of the second position with the die face held facing the second position, a single pressing die having a face mating with the face of the forming die, support structure connected to said pressing die for holding it opposite said second position with its face held to receive the forming die as it is moved into said second position, said operating mechanism being connected to apply suction and form a pulp mass in the first die while it is in the slurry and to press the dies together in said second position to compact the formed mass and transfer it to the pressing die, said operating mechanism also including means for linearly translating said pressing die to a remote region after transfer of said formed mass, and unloading elements connected to transfer the compacted mass from the pressing die onto a carrier at said remote region when the forming die is withdrawn from the second position.

5. The combination of claim 4 in which the operating mechanism includes translating structure connected to lift and lower the forming die out of and into the slurry, and also includes inverting links connected to automatically turn the forming die face up each time it is brought into its second position.

6. In a pulp molding apparatus, a tank for holding a pulp slurry, a support adjacent said tank, a forming die having a suitably shaped perforated forming face, a holder on which said die is carried, said holder being rotatably supported on opposed shaft elements slidably fitted in fixed linear guide slots in said support and including a pair of outstanding parallel arms, said shaft elements being connected to operating members by which they are traversed in each direction in the slots, to move said die from a position within the slurry in the tank to a position remote therefrom, and inverting mechanism connected to said arms to automatically cause them to rotate around said shaft elements at a predetermined position during a portion of their traverse of the shaft elements in the slots.

7. The combination of claim 6 in which the inverting mechanism includes a movable link having a deflecting slot with aligned linear ends and an offset intermediate section, said deflecting slot receiving one of said shaft elements, and the link having a slidable connection with one of said arms.

References Cited in the file of this patent

UNITED STATES PATENTS

| Re. 19,856 | Chapman | Feb. 18, 1936 |
| 827,765 | Ward | Aug. 7, 1906 |
| 1,377,342 | Harbrecht | May 10, 1921 |
| 1,413,178 | Manson | Apr. 18, 1922 |
| 1,621,401 | Foy | Mar. 15, 1927 |
| 1,707,429 | Chaplin | Apr. 2, 1929 |
| 1,880,458 | Morris | Oct. 4, 1932 |
| 1,918,782 | Randall | July 18, 1933 |
| 2,225,134 | Skolnik | Dec. 17, 1940 |
| 2,245,678 | Keiding | June 17, 1941 |
| 2,257,573 | Randall | Sept. 30, 1941 |
| 2,307,022 | Chaplin | Jan. 5, 1943 |
| 2,346,608 | Randall | Apr. 11, 1944 |
| 2,494,743 | Chaplin | Jan. 17, 1950 |
| 2,705,442 | Kyle et al. | Apr. 5, 1955 |

FOREIGN PATENTS

| 517,835 | Great Britain | Feb. 9, 1940 |